United States Patent
Wu et al.

(10) Patent No.: US 10,225,713 B2
(45) Date of Patent: Mar. 5, 2019

(54) METHOD FOR ESTABLISHING WIRELESS CONNECTION AND RELATED ELECTRONIC DEVICES

(71) Applicant: HTC Corporation, Taoyuan, Taoyuan County (TW)

(72) Inventors: Jenn-Wein Wu, Taoyuan (TW); Chien-Chuan Chang, Taoyuan (TW); Yung-Chao Tseng, Taoyuan (TW); Hsin-Ti Chueh, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 504 days.

(21) Appl. No.: 14/509,586

(22) Filed: Oct. 8, 2014

(65) Prior Publication Data

US 2015/0381830 A1 Dec. 31, 2015

Related U.S. Application Data (60) Provisional application No. 62/017,843, filed on Jun. 27, 2014.

(51) Int. Cl.
| | |
|---|---|
| *H04W 4/80* | (2018.01) |
| *H04W 76/14* | (2018.01) |
| *H04N 21/414* | (2011.01) |
| *H04N 21/4363* | (2011.01) |
| *H04N 21/442* | (2011.01) |

(Continued)

(52) U.S. Cl.
CPC ........ *H04W 4/80* (2018.02); *H04N 21/41407* (2013.01); *H04N 21/43637* (2013.01); *H04N 21/44227* (2013.01); *H04W 76/14* (2018.02); *H04N 5/23206* (2013.01);

(Continued)

(58) Field of Classification Search
CPC ...................................................... H04W 4/80
See application file for complete search history.

(56) References Cited

U.S. PATENT DOCUMENTS

| | | | | |
|---|---|---|---|---|
| 5,942,985 A | * | 8/1999 | Chin ................ | G07C 9/00309 340/10.33 |
| 6,078,816 A | * | 6/2000 | Weiss ............... | H04M 19/04 455/226.4 |

(Continued)

FOREIGN PATENT DOCUMENTS

TW 201417614 A 5/2014

*Primary Examiner* — Hsinchun Liao
(74) *Attorney, Agent, or Firm* — Birch, Stewart, Kolasch & Birch, LLP (57) ABSTRACT

A method for establishing a wireless connection comprises initiating, by a first device, a procedure of establishing a first wireless connection of a first communication protocol with relatively higher data rate and higher power consumption, between the first electronic device and a second electronic device, in response to one of: (a) detecting a first signal from a peripheral unit of the first electronic device, the first signal leading the first electronic device to become active and (b) detecting a second signal from the second electronic device via a second wireless connection of a second communication protocol established between the first electronic device and the second electronic device, the second signal indicating that the second electronic device is in use, or in response to (c) detecting the first signal that is detected within a predetermine time after receiving the second signal.

8 Claims, 8 Drawing Sheets

(51) Int. Cl.
    *H04N 5/232*     (2006.01)
    *H04W 76/30*     (2018.01)
    *H04W 84/12*     (2009.01)
    *H04W 84/18*     (2009.01)
    *H04W 88/06*     (2009.01)

(52) U.S. Cl.
    CPC ............ *H04W 76/30* (2018.02); *H04W 84/12* (2013.01); *H04W 84/18* (2013.01); *H04W 88/06* (2013.01)

(56) References Cited

U.S. PATENT DOCUMENTS

| | | | |
|---|---|---|---|
| 2008/0166967 A1 | 7/2008 | McKillop | |
| 2008/0181315 A1* | 7/2008 | Wang ................. | H04L 25/0272 375/257 |
| 2009/0034498 A1* | 2/2009 | Banerjea ............ | H04W 76/025 370/338 |
| 2013/0028224 A1* | 1/2013 | Chen ................... | H04W 76/10 370/329 |

\* cited by examiner

METHOD FOR ESTABLISHING WIRELESS CONNECTION AND RELATED ELECTRONIC DEVICES

CROSS REFERENCE TO RELATED APPLICATIONS

This application claims the benefit of U.S. Provisional Application No. 62/017,843, filed on Jun. 27, 2014 and entitled "ELECTRONIC SYSTEM AND PREDICTION METHOD FOR ESTABLISHING WI-FI CONNECTION FASTER", the contents of which are incorporated herein in their entirety.

BACKGROUND OF THE INVENTION

1. Field of the Invention

The present invention relates to a method for establishing a wireless connection and related electronic devices.

2. Description of the Prior Art

Portable electronic devices such as laptops, smartphones, tablets and digital cameras bring convenience into modern society, and a user can directly transfer files in a device to another device through a wireless connection. For example, a user may transfer photos in a digital camera to a smartphone, or send video clips in the smartphone to a laptop through a wireless connection.

Wireless communications in a short range can be realized by a variety of wireless communication standards, including Bluetooth/BLE (Bluetooth low energy), Wi-Fi/Wi-Fi Direct, Near-field communication (NFC), etc., where some support a high data rate and are proper for transmission of large files and others support a low data rate but a quick set-up time, suitable for control and data exchange.

When a user wants to transfer photos in a digital camera to a mobile phone, review/preview data stored in the camera on the mobile phone, or use a camera application in the mobile phone to interact with the camera, it takes a certain amount of time and actions before data transmission starts, because the user has to unlock the mobile phone, launch the control menu and turn on the Wi-Fi function for establishing the connection between the digital camera and the mobile phone. It is even worse when a peer-to-peer connection such as Wi-Fi Direct is used, since it takes a longer time to establish a peer-to-peer group between the digital camera and the mobile phone.

SUMMARY OF THE INVENTION

It is there for an objective to provide a method for establishing a wireless connection and related electronic devices.

According to one embodiment of the present invention, a method for establishing a wireless connection between a first electronic device and a second electronic device is provided. The method is utilized in the first electronic device and includes initiating, by the first device, a procedure of establishing a first wireless connection of a first communication protocol between the first electronic device and the second electronic device, in response to one of (a) detecting a first signal from a peripheral unit of the first electronic device, the first signal leading the first electronic device to become active and (b) detecting a second signal from the second electronic device via a second wireless connection of a second communication protocol established between the first electronic device and the second electronic device, the second signal indicating that the second electronic device is in use, or in response to (c) detecting the first signal that is detected within a predetermine time after detecting the second signal, wherein the first wireless connection of the first communication protocol consumes relatively higher power and provides a relatively higher date rate than the second wireless connection of the second communication protocol.

According to one embodiment of the present invention, a method for establishing a wireless connection between a first electronic device and a second electronic device is provided. The method is utilized in the second electronic device and includes transmitting a first signal from the second electronic device to the first electronic device via a second wireless connection of a second communication protocol, in response to detecting a second signal from a peripheral unit of the second electronic device, wherein the first signal notifies the first electronic device of initiating a procedure of establishing a first wireless connection of a first communication protocol between the first electronic device and the second electronic device, and wherein the first wireless connection of the first communication protocol consumes relatively higher power and provides a relatively higher data rate than the second wireless connection of the second communication protocol.

According to one embodiment of the present invention, an electronic device includes a peripheral unit, a first communication unit implementing a first communication protocol, a second communication unit implementing a second communication protocol, and a control unit. The peripheral unit is configured to transmit a first signal which leads the electronic device to become active. The first communication unit is configured to establish a first wireless connection of the first communication protocol between the electronic device and a cooperating device. The second communication unit is configured to establish a second wireless connection of the second communication protocol the electronic device and the cooperating device, via which a second signal indicating that a cooperating device is in use is transmitted from the cooperating device to the electronic device, wherein the first wireless connection of the first communication protocol consumes relatively higher power and provides a relatively higher data rate than the second wireless connection of the second communication protocol. The control unit is coupled to the peripheral unit, the first communication unit and the second communication unit, and is configured to initiate a procedure of establishing the first wireless connection between the electronic device and the cooperating device in response to one of (a) detecting the first signal from the peripheral unit and (b) detecting the second signal from the cooperating device, or in response to (c) detecting the first signal that is detected within a predetermine time after receiving the second signal.

According to one embodiment of the present invention, an electronic device includes a camera unit, a peripheral unit, a control unit, a first communication unit implementing a first communication protocol, and a second communication unit implementing a second communication protocol. The camera unit is configured to capture images. The peripheral unit is configured to transmit a first signal leading the electronic device to become active. The control unit is coupled to the camera unit and the peripheral unit, and is configured to generate a second signal in response to receiving the first signal from the peripheral unit, wherein the second signal indicates that electronic device is in use. The first communication unit is configured to establish a first wireless connection of the first communication protocol between the electronic device and a cooperating device. The second communication unit is configured to establish a second wireless connection of the second communication protocol, via which the second signal is transmitted from the electronic device to the cooperating device, wherein the first wireless connection of the first communication protocol consumes relatively higher power and provides a relatively higher data rate than the second wireless connection of the second communication protocol.

These and other objectives of the present invention will no doubt become obvious to those of ordinary skill in the art after reading the following detailed description of the preferred embodiment that is illustrated in the various figures and drawings.

DETAILED DESCRIPTION OF ILLUSTRATED EMBODIMENTS

The following description provides several embodiments carrying out the invention, which aims to reduce time wasted on waiting for the wireless connection being established. User experience in data transmission, including file transfer from one device to another device, remote review/preview, interacting with the other device by a related application, etc., can be improved. The description is made for the purpose of illustrating the general principles of the invention and should not be taken in a limited sense.

Processes as embodiments of the present invention are used for establishing a wireless connection between two devices, wherein one device, called an electronic device 10 hereinafter, intends to receive data such as image or video files from the other device, called an electronic device 20 hereinafter. The electronic devices 10 and 20 are implemented with at least two wireless communication protocols, in which one protocol has a relatively higher data rate and relatively higher power consumption than the other protocol. The electronic device 10 in the illustrated embodiment can be, but not limited to, a mobile phone, a tablet or a laptop. The electronic device 20 in the illustrated embodiment can be a digital camera or a video recorder, and can also be, but not limited to, a mobile phone, a tablet, or a laptop.

In a process 1 as one embodiment of the present invention, the electronic device 10, in response to detecting at least one of a first signal which leads the electronic device 10 to become active and a second signal sent from the electronic device 20 via a second wireless connection, initiates a procedure of establishing a first wireless connection between the electronic device 10 and the electronic device 20. The first wireless connection are established based on a first wireless communication protocol having a relatively higher data rate and relatively higher power consumption than a second wireless communication protocol that is used for establishing the second wireless connection.

In a process 2 as another embodiment of the present invention, the electronic device 10, in response to detecting the second signal and also detecting the first signal within a predetermine time after detecting the second signal, initiates the procedure of establishing the first wireless connection between the electronic device 10 and the electronic device 20.

In one embodiment, the first wireless communication protocol can be, but not limited to, Wi-Fi (IEEE 802.11 series), which is suitable for transmission of large data such as images and videos, and the second wireless communication protocol with a relatively lower data rate and relatively lower power consumption can be, but not limited to, BLE (Bluetooth low energy) or NFC (Near-field communication). In another embodiment, the first wireless communication protocol can be Wi-Fi accompanying with Wi-Fi Direct for high speed peer-to-peer communication. It should be noted that the peer-to-peer communication function is an optional function that the electronic devices may have but not a mandatory function. The electronic device 10 or the electronic device 20 equipped with typical Wi-Fi (not accompanying with Wi-Fi Direct) can communicate with another electronic device equipped with Wi-Fi Direct.

For illustration purpose, Wi-Fi is taken here as the first wireless communication protocol, and BLE is taken here as the second wireless communication protocol. The wireless connections of the corresponding wireless communication protocols are called a Wi-Fi connection and a BLE connection in short. Media data (e.g., image or video files) is better transmitted over the Wi-Fi connection than the BLE connection.

In the above illustrated embodiments, the second signal is sent via the second wireless connection. Therefore, in the above illustrated embodiments, the process 1 and the process 2 are performed only when the second wireless connection, e.g., BLE connection, exists. The BLE connection may be disconnected, when one of the electronic devices moves out of a predetermined range, when the electronic device 10 determines that the received signal strength over the BLE connection is lower than a predetermined strength, or when the electronic device 10 determines that the second wireless connection needs to be disconnected for some other reasons.

In one embodiment, the first signal in the process 1 can be a wakeup signal, which leads the electronic device 10 to become active, and more specifically, a signal triggering a state transition for an operating system of the electronic device 10, such as transition from a sleep state (in which the screen backlight is OFF) to an idle state (in which the screen backlight is ON or in dimming), or transition from the idle state to an active state (also known as a running state as the operating system is running). The wakeup signal is generated in the electronic device 10. Different state transitions are caused by events occurring in different peripherals of the electronic device 10, such as an input interface (including keys or keypad), a touch screen, a camera unit, etc.

In one embodiment, the second signal in the process 1 can be an in-use signal, which is a signal indicating that the electronic device 20 is in use, intended to be used, or ready to be used. The in-use signal is generated by the electronic device 20 in response to an event occurring in the electronic device 20, and there are different events bringing slightly different meanings to the in-use signal. The term "in-use" or "in use" in the following description is used for defining a status that the electronic device 20 is being used, or is going to be used soon.

Figure 1:
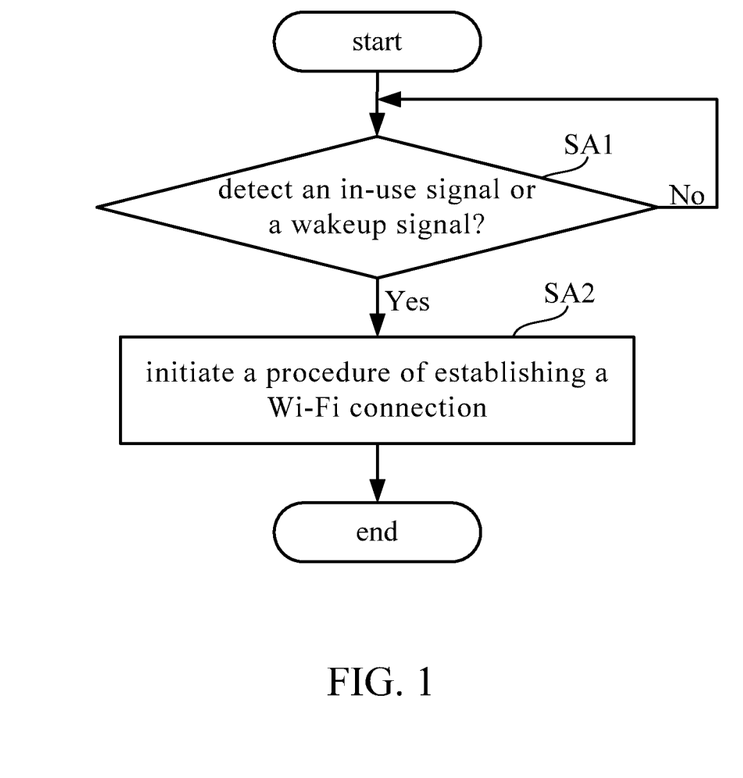
FIGS. 1-3 are flowcharts of processes according to embodiments of the present invention.

FIG. 1 illustrates a flowchart of a process as an embodiment of the process 1. In step SA1, the electronic device 10 detects whether a wakeup signal is generated in the electronic device 10 and detects whether an in-use signal from the electronic device 20 via the BLE connection is received.

If the electronic device 10 detects either or both of the wakeup signal and the in-use signal, the electronic device 10 performs step SA2 to initiate a procedure of establishing a Wi-Fi connection between the electronic device 10 and the electronic device 20. If neither of the wakeup signal and in-use signal is detected, the electronic device 10 does not initiate the procedure of establishing a Wi-Fi connection between the electronic device 10 and the electronic device 20 and the process goes back to step SA1.

In another embodiment of the process 1, the electronic device 10 may simply detects whether the in-use signal from the electronic device 20 via the BLE connection is received regardless of whether detecting the wakeup signals, and the electronic device 10 initiates the procedure of establishing the Wi-Fi connection between the electronic devices 10 and 20 in response to detecting the in-use signal.

In still another embodiment of the process 1, the electronic device 10 may simply detects whether the wakeup signal is generated in the electronic device 10 regardless of whether detecting the in-used signals, and the electronic device 10 initiates the procedure of establishing the Wi-Fi connection between the electronic devices 10 and 20 in response to detecting the wake-up signal.

Figure 2:
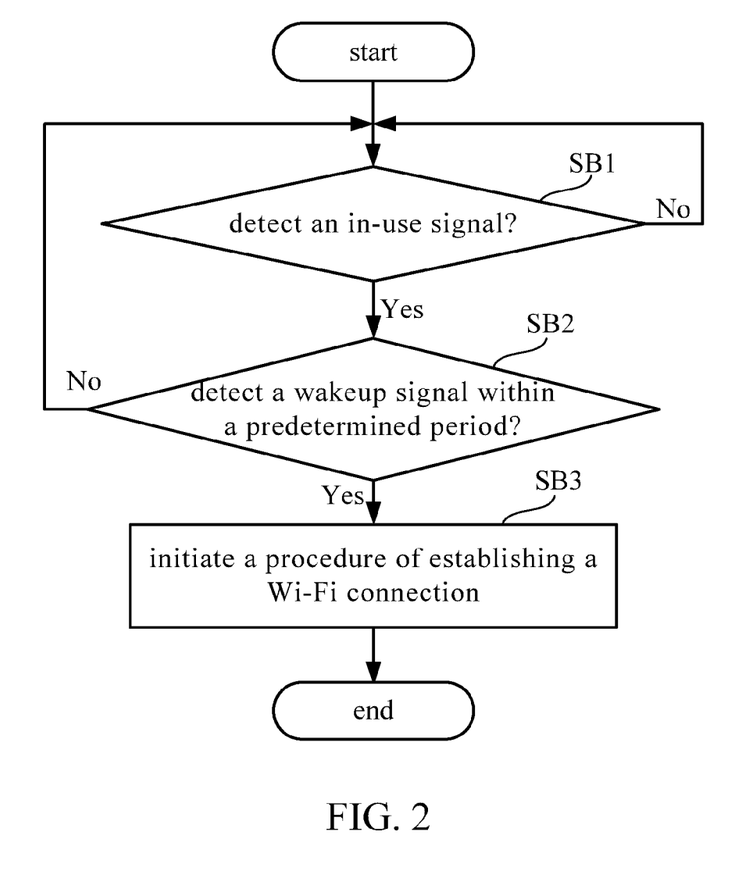

FIG. 2 illustrates a flowchart of a process as an embodiment of the process 2. In step SB1, the electronic device 10 detects whether an in-use signal sent from the electronic device 20 via the BLE connection is received. If the electronic device 10 determines that the in-use signal is not received, the electronic device 10 does not initiate the procedure of establishing a Wi-Fi connection between the electronic device 10 and the electronic device 20 and the process goes back to step SB1. If the electronic device 10 determines that the in-use signal is received, the electronic device 10 performs step SB2, detecting whether a wakeup signal is received within a predetermined period after receiving the in-use signal. If the electronic device 10 determines that the wakeup signal is detected within the predetermined period, the electronic device 10 then perform step SB3, initiating the procedure of establishing the Wi-Fi connection between the electronic device 10 and the electronic device 20 in response. If the electronic device 10 determines that the wakeup signal is not detected within the predetermined period, the electronic device 10 does not initiate the procedure of establishing a Wi-Fi connection between the electronic device 10 and the electronic device 20 and the process goes back to step SB1.

In the above mentioned embodiments, the step of initiating the procedure of establishing the wireless connection, called the initiating step in short, includes a step of the electronic device 10 transmitting a request signal, via the BLE connection, to the electronic device 20, for requesting the electronic device 20 to establish the Wi-Fi connection with the electronic device 10. In one embodiment, the initiating step may further include a step of turning on a Wi-Fi module (or transceiver) of the electronic device 10; however, the step of turning on the Wi-Fi module may not be required when the Wi-Fi module has been in ON state.

The electronic device 10 establishes the Wi-Fi connection with the electronic device 20 according one of conventional methods of establishing the Wi-Fi connection and the method to be used may be selectively decided based on, but not limited to, the hardware capability of the electronic device 10 or the electronic device 20. Some of the conventional methods and the required capability are briefly introduced as follows.

In one embodiment, if the electronic device 10 and the electronic device 20 are equipped with a legacy Wi-Fi function which does not support Wi-Fi Direct, the electronic device 10 can act as a software access point (a.k.a. soft AP) and establish the Wi-Fi connection with the electronic device 20 acting a station.

In another embodiment, if the electronic device 10 and the electronic device 20 are equipped with a Wi-Fi function accompanying with Wi-Fi Direct, either the electronic device 10 or the electronic device 20 acts as a peer-to-peer group owner (P2P GO) and the other device acts as a P2P client. In this case, the electronic device 10 (which acts as a P2P GO) follows the standard procedure specified in the Wi-Fi Direct protocol to establish the Wi-Fi connection, i.e., a Wi-Fi Direct connection, with the electronic device 20. For example, if the electronic devices 10 and 20 have not yet been paired and grouped, they have to perform a device discovery procedure and a group formation procedure (which is defined in the Wi-Fi Direct protocol) to establish a successful Wi-Fi Direct connection. Since the procedure of establishing a Wi-Fi Direct connection spends considerable time (e.g., over 10 seconds), applying the process 1 can have the Wi-Fi Direct connection setup in a well-prepared status before media data transmission begins.

In another embodiment, if the electronic device 10 is equipped with only the legacy Wi-Fi function or cannot use its Wi-Fi Direct function for some reason and the electronic device 20 is equipped with the Wi-Fi Direct function (and can be a P2P client or a P2P GO), the electronic device 10 (which can act only as a P2P client) may firstly send a signal to the electronic device 20 via the BLE connection to inform the capability of the electronic device 10 as "not support Wi-Fi Direct", during the initiating step (e.g., SA1, SB3). Then, the electronic device 20, if its default mode is being a P2P client, may change its role from the P2P client to a P2P GO, and the electronic device 10 acting as the P2P client also follows the standard procedure specified in the Wi-Fi Direct protocol to establish the Wi-Fi connection, i.e., a Wi-Fi Direct connection, with the electronic device 20 acting as the P2P GO.

In the above illustrated embodiments, the electronic device 10 treats the in-use signal and/or the wakeup signal as an indication that it is likely that upcoming media data will be sent from the electronic device 20 to the electronic device 10, and can, instead of passively establishing a wireless connection upon request from the user, proactively establishes a wireless connection with the electronic device 20. The wireless connection between the electronic devices 10 and 20 can be setup ready faster than the conventional way, which requires manual request or actions from the user. Therefore, when the user wants to use an application associated with the electronic device 20, e.g. a file transfer application or a customized application for the electronic device 20, the user can just simply launch the application without the need to manually setup the wireless connection between the electronic devices 10 and 20.

In one embodiment, the electronic device 10 can choose to perform the process 1 (e.g., the process of FIG. 1) or the process 2 (e.g., the process of FIG. 2) or switch between the process 1 and the process 2 for establishing different wireless connections. For example, after a current Wi-Fi connection established by using the process 2 is disconnected, the electronic device 10 can restart the process 2 or decide to perform the process 1 instead, to establish a next Wi-Fi connection between the electronic devices 10 and 20.

In one embodiment, as long as the electronic device 10 and the electronic device 20 are connectable via the second wireless connection (e.g., BLE connection), the electronic device 10 maintains the second wireless connection (e.g., BLE connection) regardless of whether the first wireless connection (e.g., Wi-Fi connection) is maintained. By maintaining the second wireless connection (e.g., BLE connection), signals such as the in-use signal and the request signal can be sent between the electronic device 10 and the electronic device 20, so as to initiate the procedure of establishing the first wireless connection (e.g., Wi-Fi connection) between the electronic device 10 and the electronic device 20.

In one embodiment, a current Wi-Fi connection established based on the process 1 or process 2 lasts for a predetermined period of time unless the electronic device 10 extends the Wi-Fi connection during the current Wi-Fi connection. In one embodiment, during the current W-Fi connection, the electronic device 10 extends the Wi-Fi connection for a predetermined period, if an additional in-use signal is received or if an application related to the electronic device 20 is running. On the other hand, during the current W-Fi connection, if an application related to the electronic device 20 is never launched and no additional in-use signal is received, the electronic device 10 disconnects or terminates the current W-Fi connection. In another embodiment, the electronic device 10 can send another signal, via the BLE connection, to the electronic device 20 to turn off the Wi-Fi module or transceiver of the electronic device 20, which saves power consumption of the electronic device 20.

In an embodiment, the electronic device 10 extends the Wi-Fi connection by resetting a connection time period for the current Wi-Fi connection to be the predetermined period. For example, a current Wi-Fi connection established based on the process 1 or process 2 lasts for a predetermined period Tc unless the electronic device 10 extends the Wi-Fi connection during the current Wi-Fi connection. If the electronic device 10 extends the Wi-Fi connection after a period of $T_P$ ($<T_C$) of the current (or previously extended) Wi-Fi connection has passed, the electronic device 10 extends the Wi-Fi connection by resetting a connection time period for the current Wi-Fi connection to be a period of $T_C$, or to be a different extending period.

In one embodiment, after the Wi-Fi connection between the electronic device 10 and the electronic device 20 has been established, even though in some circumstances or for some reasons the BLE connection may not be maintained, the electronic device 10 may keep performing data transmission through the currently established Wi-Fi connection as long as the currently established Wi-Fi connection is being maintained.

In another embodiment, after the Wi-Fi connection between the electronic device 10 and the electronic device 20 has been established, the BLE connection is maintained as long as possible. By maintaining the BLE connection, the electronic device 10 has more chances to receive next in-use signals, which can be used for determining to extend the Wi-Fi connection (longer), improving the convenience.

Figure 3:
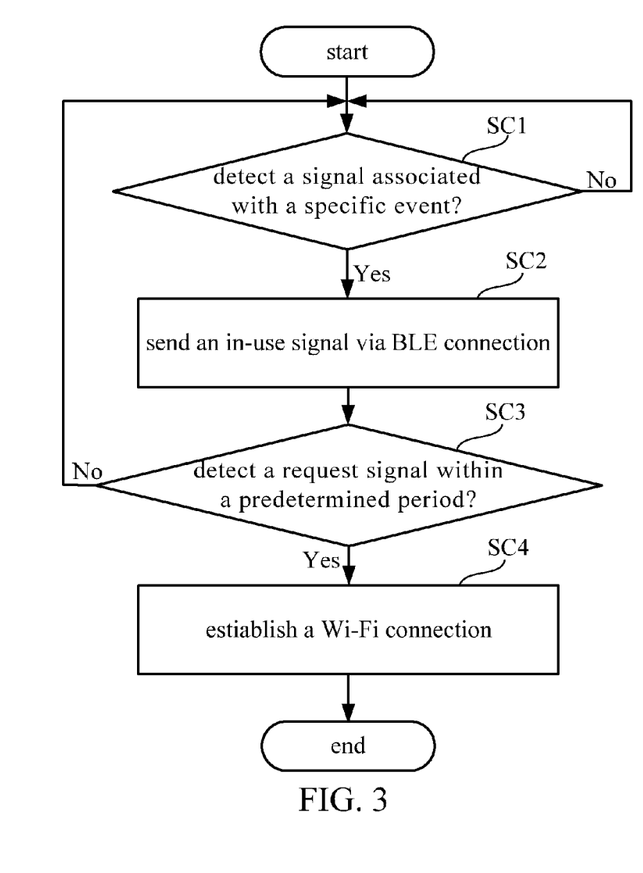

FIG. 3 illustrates a flowchart of a process 3 according to another embodiment of the present invention. The process 3 is utilized in the electronic device 20. In step SC1, the electronic device 20 detects whether a signal is received from a peripheral unit of the electronic device 20, such as an input interface including buttons/keys or keypad, a hold sensor, a touch sensor, touch screen, camera unit, etc.

In one embodiment, the signal is sent from the peripheral unit in response to a specific event, such as a press event or a hold event occurring in the electronic device 20. If the electronic device 20 determines that the signal is not received, the electronic device 20 does not initiate the procedure of establishing the first wireless connection (e.g., Wi-Fi connection) between the electronic device 10 and the electronic device 20 and the process goes back to step SC1. If the electronic device 20 determines that the signal associated with the specific event is received, the electronic device 20 performs step SC2, transmitting an in-use signal to the electronic device 10 via the second wireless connection (e.g., BLE connection). The in-use signal, sent from the electronic device 20, notifies the electronic device 10 of initiating the procedure of establishing a Wi-Fi connection with the electronic device 20. It should be noted that, the electronic device 20 still keeps performing step SC1 (i.e., detects whether a signal is received from a peripheral unit of the electronic device 20) after sending the in-use signal.

In one embodiment, after the in-use signal is sent, in step SC3, the electronic device 20 detects whether a request signal is received from the electronic device 10 within the predetermined period, wherein the request signal is mentioned as in the embodiments of the processes 1 and 2. If the electronic device 20 determines that the request signal is received within a predetermined period after receiving the in-use signal, the electronic device 20 then performs step SC4, establishing the Wi-Fi connection in response to receiving the request signal (within the predetermined period). If the electronic device 20 determines that the request signal is not received with the predetermined period, the electronic device 20 goes back to step SC1.

In one embodiment, after receiving the request signal within the predetermined period, the electronic device 20 may firstly need to turn on a Wi-Fi module (or transceiver) of the electronic device 20 before it start step SC4 of establishing the Wi-Fi connection. However, the step of turning on the Wi-Fi module may not be required when the Wi-Fi module has been in ON state.

In one embodiment, as long as the electronic device 10 and the electronic device 20 are connectable via the second wireless connection (e.g., BLE connection), the electronic device 20 maintains the second wireless connection (e.g., BLE connection) regardless of whether the first wireless connection (e.g., Wi-Fi connection) is maintained. By maintaining the second wireless connection (e.g., BLE connection), signals such as the in-use signal and the request signal can be sent between the electronic device 10 and the electronic device 20, so as to initiate the procedure of establishing the first wireless connection (e.g., Wi-Fi connection) between the electronic device 10 and the electronic device 20.

In one embodiment, after the Wi-Fi connection is established, the Wi-Fi module or Wi-Fi transceiver of the electronic device 20 may be turned off (and thus the current Wi-Fi connection is disconnected) in response to receiving another request signal via the BLE connection from the electronic device 10. It should be noted that the electronic device 10 sends this request signal for turning off the Wi-Fi module of the electronic device 20 only when the electronic device 10 determines that the currently prepared Wi-Fi connection is no longer required, e.g., when the application related to the electronic device 20 is not launched during the current Wi-Fi connection.

In another embodiment, the electronic device 20 can send another request signal, via BLE connection, notifying the electronic device 10 of disconnecting the current Wi-Fi connection between the electronic devices 10 and 20, if the electronic device 20 does not detect any press event or hold event for a predetermined period.

FIGS. 4-7 illustrate exemplary message flow diagrams for the electronic devices 10 and 20 according to the above illustrated embodiments.

Figure 4:
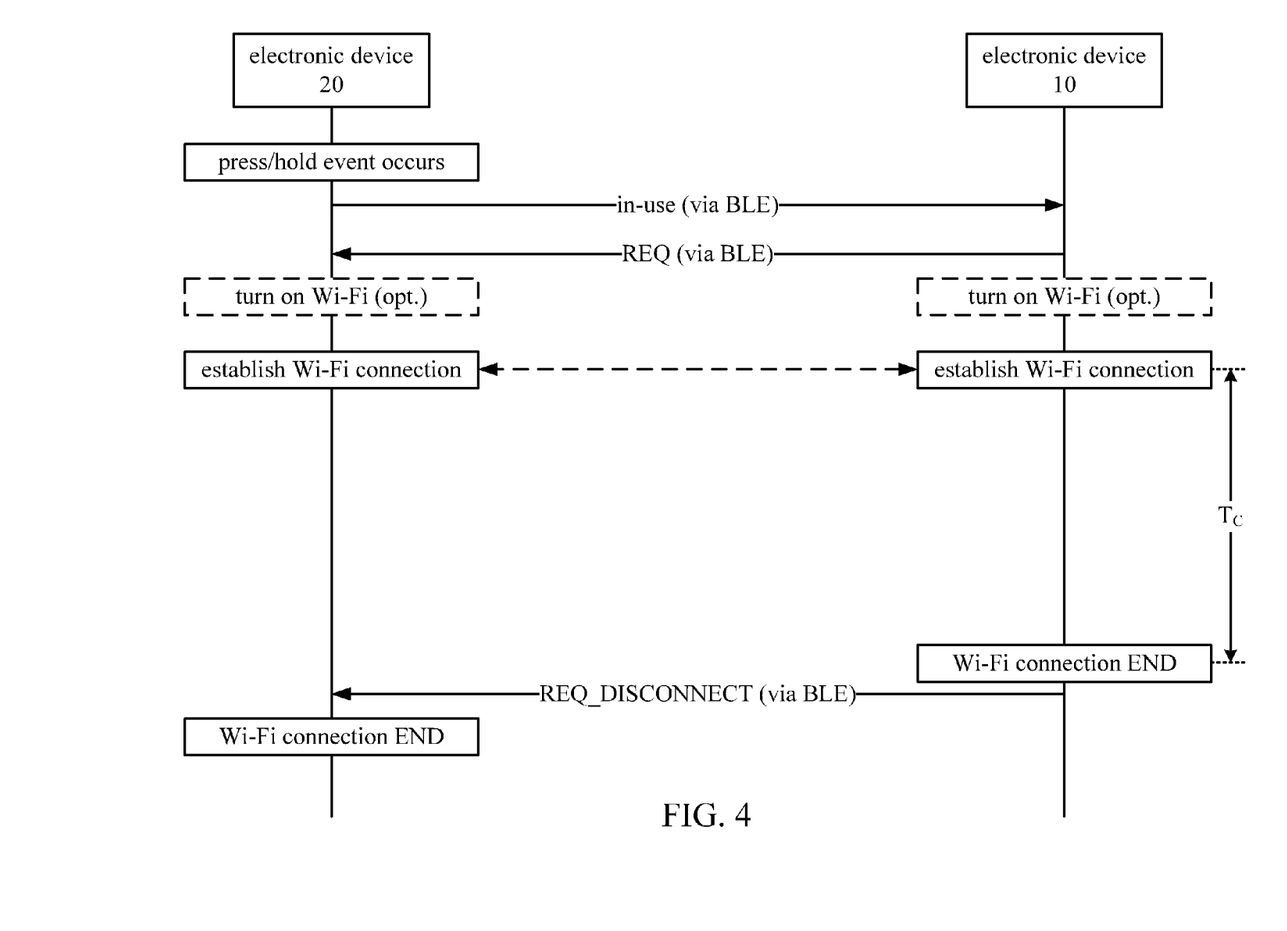
FIGS. 4-7 are message flow diagrams according to embodiments of the present invention.

In one embodiment, the process of FIG. 1 and the process of FIG. 3 can be illustrated in the message flow of FIG. 4. As shown in this messages flow, the electronic device 10 receives the in-use signal (for example due to a press event or a hold event) from the electronic device 20 via the BLE connection, and initiates the procedure of establishing the Wi-Fi connection in response to receiving the in-use signal, wherein the initiating step includes transmitting the request signal (REQ) that requests the electronic device 20 to establish the Wi-Fi connection with the electronic device 10. For each side (i.e., the electronic device 10 or 20), whether to turn on (e.g., to supply power to) the Wi-Fi module/transceiver depends on the ON/OFF state which the Wi-Fi module/transceiver is in. If the process 1 or process 3 starts in a circumstance that the Wi-Fi module/transceiver has been in the ON state (i.e., power is supplied to the module/transceiver), the step of turning on the Wi-Fi module/transceiver is not necessary.

When the electronic device 10 establishes the Wi-Fi connection, the electronic device 10 may maintain the Wi-Fi connection for at least a predetermined period, denoted as Tc in FIG. 4, for monitoring whether an application related to the electronic device 20 is launched or not. As illustrated in FIG. 4, if the electronic device 10 determines that the application related to the electronic device 20 has not been launched during Tc, the electronic device 10 then terminates or disconnects the current Wi-Fi connection between the electronic devices 10 and 20 when the period $T_C$ finishes. In addition, the electronic device 10 can send another request signal (REQ_DISCONNECT), via the BLE connection, requesting the electronic device 20 to turn off Wi-H module of the electronic device 20 for saving power consumption.

It should be noted that, the circumstance to terminate or disconnect the current Wi-Fi connection between the electronic devices 10 and 20 as shown in FIG. 4 is only one of circumstances. In some other embodiments of the present invention, the electronic device 10 can terminate or disconnect the current Wi-Fi connection, when the electronic device 10 determines that the application related to the electronic device 20 has not been launched during the predetermined period Tc and no additional in-use signal is received during the predetermined period Tc. In another embodiment, the electronic device 10 can terminate or disconnect the current Wi-Fi connection in response to receiving a signal, from the electronic device 20, which notifies the electronic device 10 of disconnecting the current Wi-Fi connection.

Figure 5:
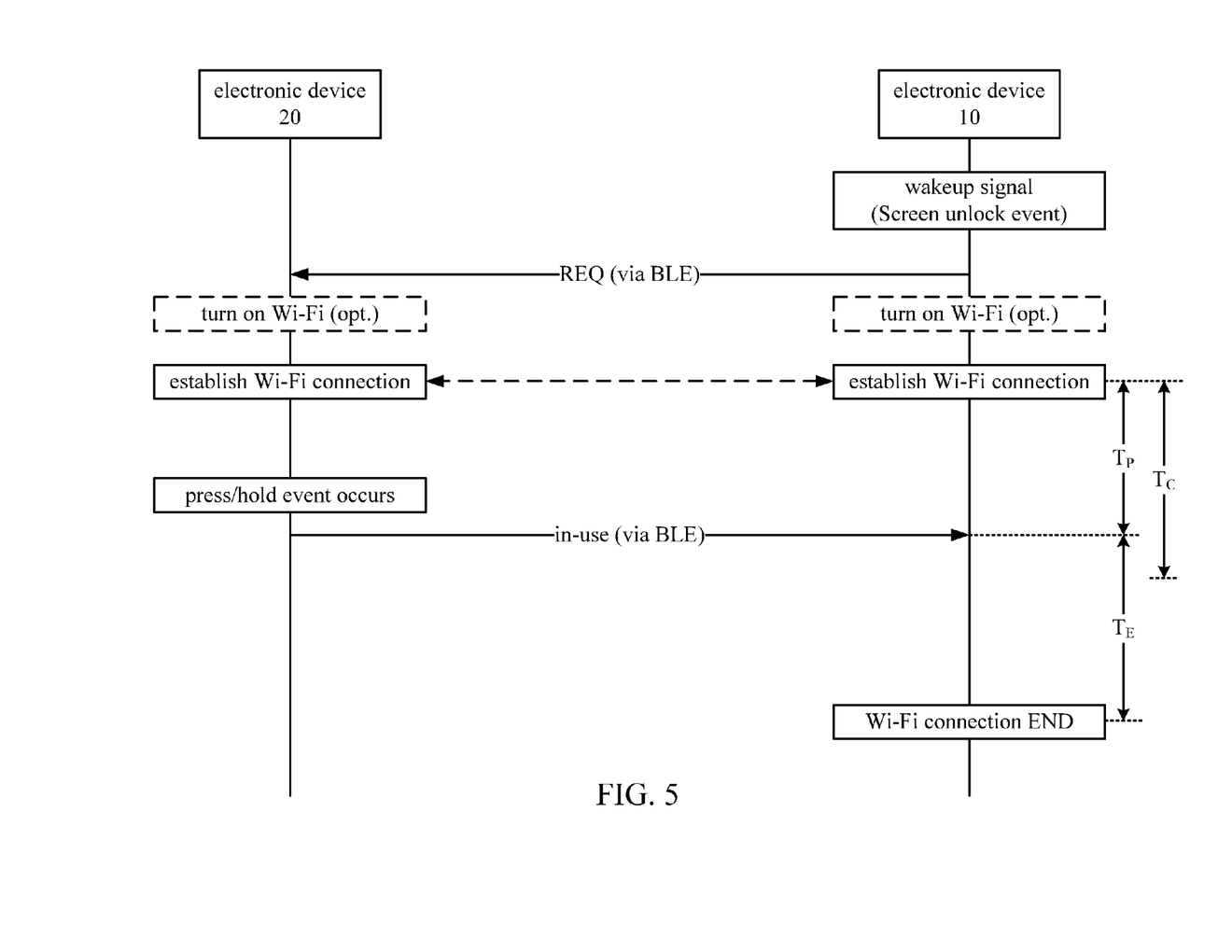

In one embodiment, the process of FIG. 1 and the process of FIG. 3 can also be illustrated in the message flow of FIG. 5. As shown in the messages flow, the electronic device 10 initiates the procedure of establishing the Wi-Fi connection in response to detecting the wakeup signal (caused by, for example, a screen unlock event or a press event), transmits the request signal (REQ), and then both of the electronic devices 10 and 20 establish the Wi-Fi connection. The Wi-Fi connection lasts for at least a predetermined period, denoted as Tc. When the electronic device 10 receives an in-use signal at the timing after a period of $T_P$ (less than Tc) of the current Wi-Fi connection has passed, the electronic device 10 extends the Wi-Fi connection by resetting a connection time period for the current Wi-Fi connection to be an extending period, denoted as $T_E$. Thus, the total of connection time for the Wi-Fi connection is $T_P+T_E$, if no more in-use signal is received. The predetermined period Tc and the extending period $T_E$ can be set the same or different.

Figure 6:
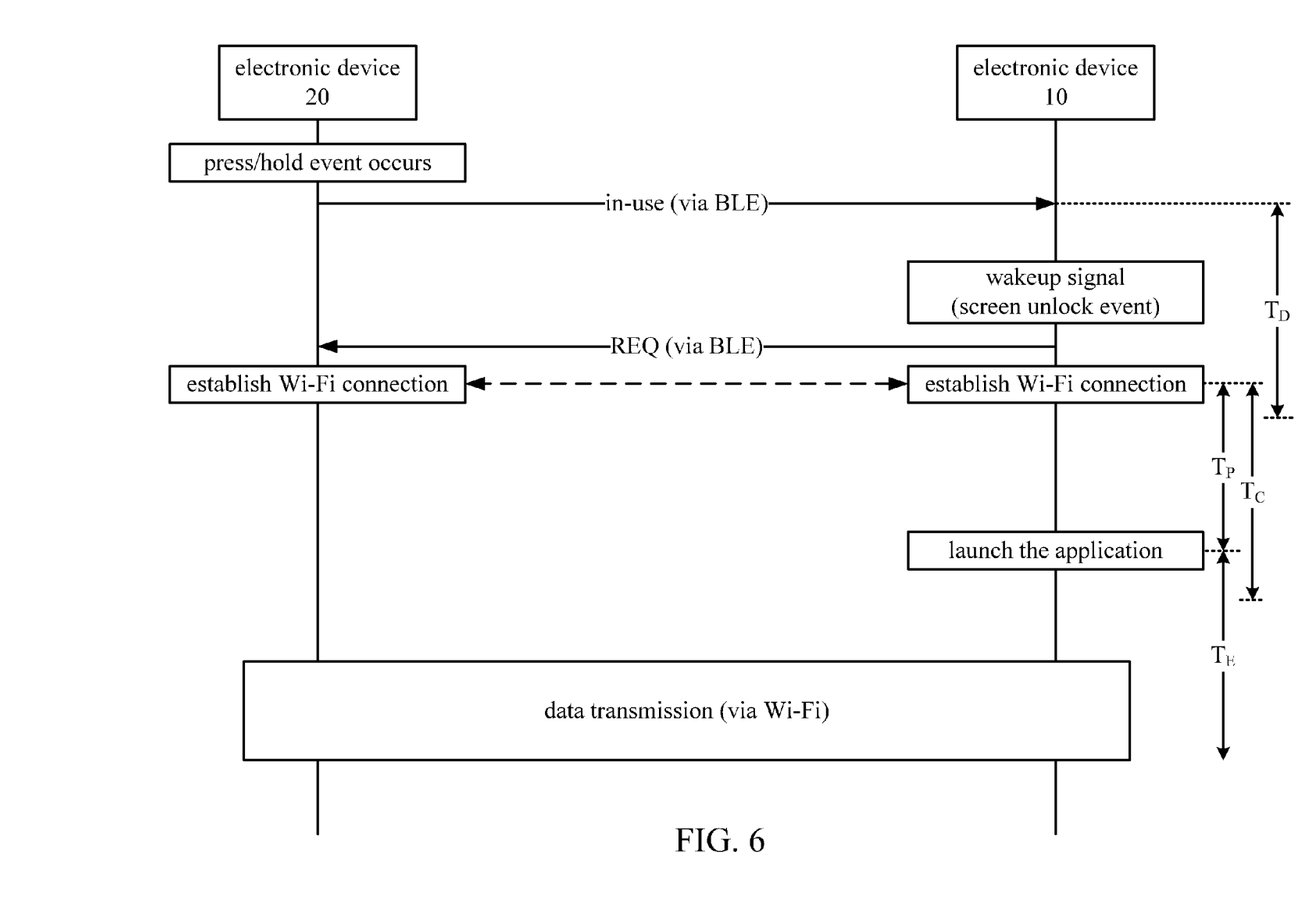

In one embodiment, the process of FIG. 2 and the process of FIG. 3 can be illustrated in the message flow of FIG. 6. As shown in the messages flow of FIG. 6, the electronic device 10 receives the in-use signal (for example due to a press event or a hold event) from the electronic device 20 via the BLE connection, and the electronic device 10 does not initiate the procedure immediately but waits and determines if the wake up signal (caused by, for example, a screen unlock event or a press event) is received within a predetermined period, denoted as $T_D$. In the example of FIG. 6, the electronic device 10 initiates the procedure of establishing the Wi-Fi connection in response to receiving the wakeup signal within $T_D$. The initiating step may include transmitting the request signal (REQ) to the electronic device 20 via the BLE connection. The electronic device 20 establishes the Wi-Fi connection in response to receiving the request signal. The Wi-Fi connection lasts for at least a predetermined period, $T_C$, and during $T_C$ the electronic device may monitor whether an application related to the electronic device 20 is launched. If the application related to the electronic device 20 is launched at the timing after a period of $T_P$ (less than Tc) of the current Wi-Fi connection has passed, the electronic device 10 extends the Wi-Fi connection by resetting a connection time period for the current Wi-Fi connection to be an extending period, denoted as $T_E$. Thus, the total of connection time for the Wi-Fi connection is predicted to be $T_P+T_E$. It should be note that, as the case shown in FIG. 6, if the data transmission via the Wi-Fi connection is still ongoing when the period of $T_P+T_E$ ends, the electronic device 10 maintains the Wi-Fi connection.

Figure 7:
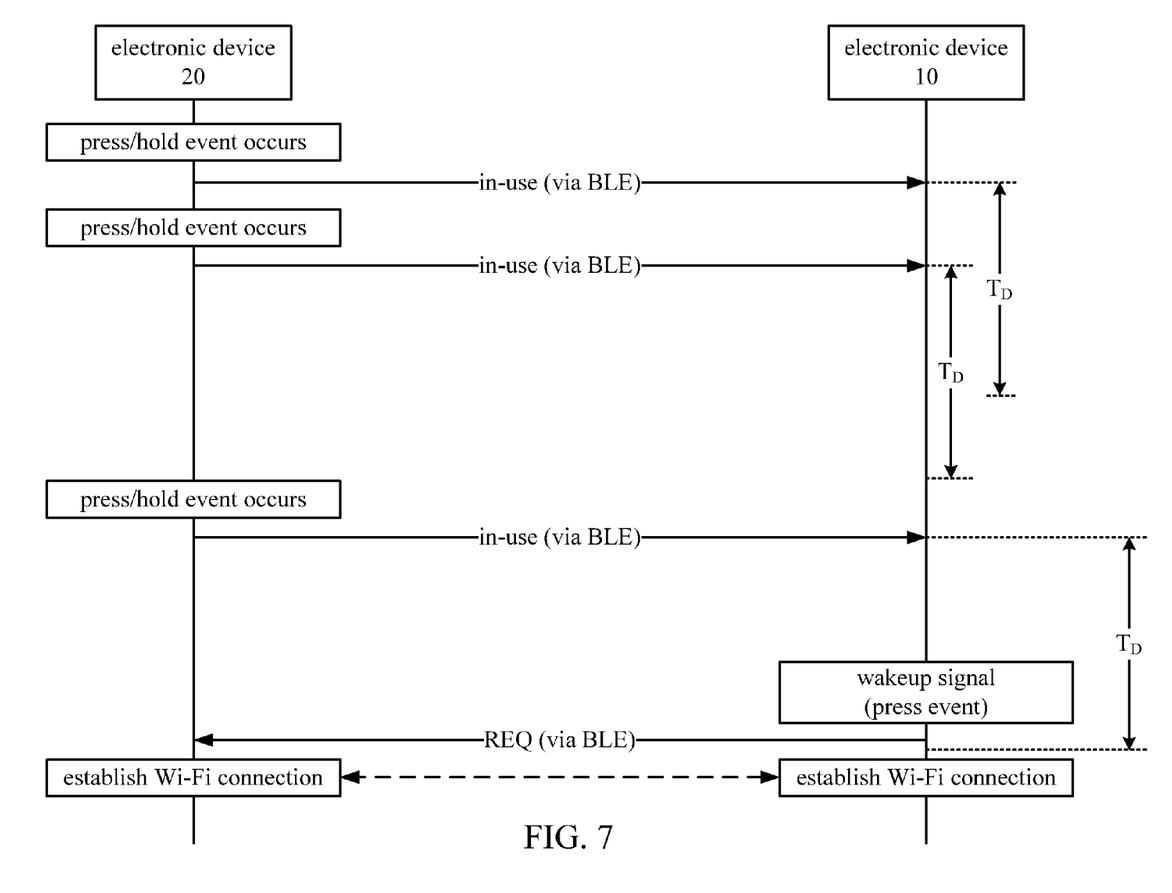

In one embodiment, the process of FIG. 2 and the process of FIG. 3 can also be illustrated in the message flow of FIG. 7. As shown in the messages flow of FIG. 7, the electronic device 10 receives several in-use signals (each caused by, for example, a press event or a hold event of the electronic device 20. However, there is no press event and no screen unlock event happening in the electronic device 10 and thus no wakeup signal is received within a predetermined period, $T_D$, after receiving each in-use signals and the electronic device 10 does not initiate the procedure of establishing the Wi-Fi connection. The electronic device 10 initiates the procedure of establishing the Wi-Fi connection when the wakeup signal has been received within $T_D$ after receiving the in-use signal. Thus, the electronic device 10 transmits the request signal (REQ) to the electronic device 20 via the BLE connection, and the Wi-Fi connection between the electronic devices 10 and 20 is established.

Figure 8:
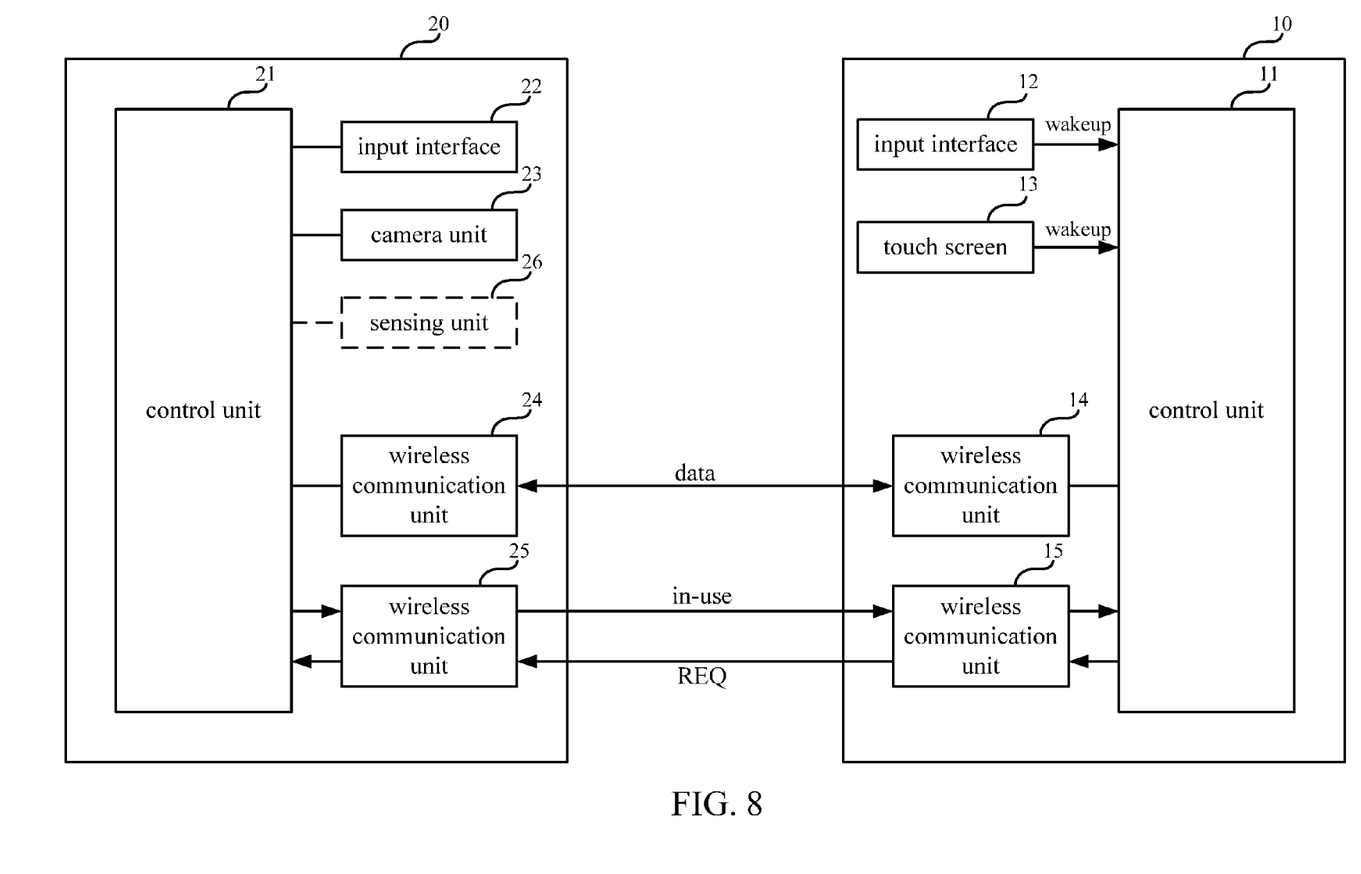
FIG. 8 is a schematic diagram of electronic devices according to an embodiment of the present invention.

FIG. 8 is a schematic diagram of the electronic device 10 and the electronic device 20 according to an embodiment of the present invention. The electronic device 10 comprises a control unit 11, an input interface 12, a touch screen 13, a wireless communication unit 14, and a low-power wireless communication unit 15. The electronic device 20 comprises a control unit 21, an input interface 22, a camera unit 23, a wireless communication unit 24, and a low-power wireless communication unit 25, and a sensing unit 26 (optional). The wireless communication units 14 and 24 are utilized for establishing the Wi-Fi connection, and the low-power wireless communication units 15 and 25 are utilized for establishing the BLE connection.

In an embodiment, the control unit 11 of the electronic device 10 is coupled to the units 12, 13, 14 and 15 of the electronic device 10 and is utilized for processing instructions and data and controlling the units 12, 13, 14 and 15.

The input interface 12 comprises at least a power button, and may also comprise volume buttons or other functional buttons. When the input interface 12 receives a press event occurring in the power button, during that the touch screen 13 is being with backlight off, the input interface 12 transmits a signal, which is the wakeup signal as mentioned in the above illustrated embodiments, to the control unit 11. In response to receiving the wakeup signal associated with the press event, the control unit 11 controls an operation system installed in the electronic device 10 to transit from a sleep state (in which the screen backlight is OFF) to an idle state (in which the screen backlight is ON or in dimming). In one embodiment, the wakeup signal associated with the press event is utilized for turning on the backlight of the touch screen 13. In another embodiment, the wakeup signal associated with the press event may result in a state transition from the sleep state (in which the screen backlight is OFF) directly to an active state, also known as a running state indicating that the operating system is running.

In one embodiment, the touch screen 13 is a module including a display such as a LCD, a touch panel, a backlight circuit and controllers or drivers. When the touch screen 13 receives a screen unlock event by a user, the touch screen 13 transmits a signal, which is also regarded as the wakeup signal as mentioned in the above illustrated embodiments, to the control unit 11. In response to receiving the wakeup signal associated with the screen unlock event, the control unit 11 controls the operation system of the electronic device 10 to transit from the idle state (in which the screen backlight is ON or in dimming) to the active state.

In another embodiment, the screen unlock event is received by another peripheral (if the electronic device 10 has) instead of the touch screen 13. The screen unlock event can be, but not limited to, a slide to unlock, drawing a pattern to unlock, entering a password or PIN code to unlock, facial recognition to unlock (received by a camera as the additional peripheral), or a fingerprint to unlock (received by another sensor as the additional peripheral), which is based on the type of a screen lock.

In one embodiment, the electronic device 10 performs the process of FIG. 1. More specifically, the control unit 11 performs step SA1 of detecting whether the in-use signal is received, by the low-power wireless communication unit 15, and/or detecting whether the wakeup signal is received from a peripheral such as the input interface 12, the touch screen 13, or another peripheral. The control unit 11 also performs step SA2, initiating the procedure of establishing the W-Fi connection, and the control unit 11 controls the low-power wireless communication unit 15 to transmit the request signal (REQ) via the BLE connection. Similarly, in another embodiment, the control unit 11 performs steps SB1, SB2 and SB3 in the process of FIG. 2.

In one embodiment, in the electronic device 20, the control unit 21 is coupled to the units 22, 23, 24 and 25 of the electronic device 20 and utilized for processing instructions and data and controlling the units 22, 23, 24 and 25. The input interface 22 comprises at least a button, which may realize multi-functions, such as power-on, taking pictures, and recording video clips. The input interface 22 transmits a signal to the control unit 21 in response to a press event occurring in the button. After the control unit 21 receives the signal associated with the press event, which means that the user is using the electronic device 20 to take a picture for example, the control unit 21 controls the camera unit 23 to generate requested media contents as images or videos accordingly. On a condition that the sensing unit 26 (e.g., a hold sensor) is in the electronic device 20, the sensing unit 26 may transmit a signal to the control unit 21 in response to a hold event or a moving event occurring due to that the user holds or touches the electronic device 20.

In one embodiment, the electronic device 20 performs the process of FIG. 3. More specifically, the control unit 21 performs step SC1 of detecting whether a signal associated with a specific event, such as the press event occurring in the input interface 22 and the hold event occurring in the sensing unit 26, is received. The control unit 21 generates a signal, which is the in-use signal, in response to receiving the signal associated with the specific event such as a press event or a hold event. The control unit 21 then performs step SC2, sending the in-use signal by the low-power wireless communication unit 25, via the BLE connection. The control unit 21 also performs step SC3, detecting whether the request signal is received, by the low-power wireless communication unit 25, via the BLE connection. The control unit 21 also performs step SC4, establishing the Wi-Fi connection with the electronic device 10.

It should be noted that the electronic device 10 and the electronic device 20 shown in FIG. 8 merely illustrate an embodiment of the present invention, and any other similar electronic devices can also realize the processes of FIGS. 1-3.

According to the above embodiments of the invention, the wireless connection between the electronic devices can be setup ready faster than the conventional way, which requires manual request or actions from the user, and when the user wants to use an application associated with a digital camera (as the electronic device 20), e.g., a file transfer application or a customized application for the digital camera, in a mobile phone (as the electronic device 10), the user can just directly launch the application and does not need to manually setup the wireless connection between the electronic devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for establishing a wireless connection between a first electronic device and a second electronic device, the method being utilized in the first electronic device, comprising:
   initiating, by the first device, a procedure of establishing a first wireless connection of a first communication protocol between the first electronic device and the second electronic device, in response to:
   detecting a first signal from a peripheral unit of the first electronic device, the first signal indicating the first electronic device to change from an inactive state to an active state, and
   detecting a second signal from the second electronic device via a second wireless connection of a second communication protocol established between the first electronic device and the second electronic device, the second signal indicating that the second electronic device is in use,
   wherein the first signal is detected within a predetermine time after detecting the second signal, and
   wherein the first wireless connection of the first communication protocol consumes relatively higher power and provides a relatively higher date rate than the second wireless connection of the second communication protocol;

maintaining the second wireless connection of the second communication protocol after the first wireless connection of the first communication protocol is established between the first electronic device and the second electronic device;

not initiating, by the first device, the procedure of establishing the first wireless connection of the first communication protocol between the first electronic device and the second electronic device, when the first signal is not detected within the predetermined time after detecting the second signal;

maintain the initiated first wireless connection for a predetermined period time unless the first electronic device extends the first wireless connection during the current first wireless connection; and the first electronic device extending the first wireless connection between the first electronic device and the second electronic device when an additional in-use signal is detected from the second electronic device via the second wireless connection.

2. The method of claim 1, wherein the step of initiating the procedure of establishing the first wireless connection comprises:

transmitting from the first electronic device, via the second wireless connection of the second communication protocol, a third signal notifying the second electronic device to establish the first wireless connection with the first electronic device, to the second electronic device.

3. The method of claim 1, further comprising:

as long as the first electronic device and the second electronic device are connectable via the second wireless connection of the second communication protocol, maintaining the second wireless connection of the second communication protocol regardless of whether the first wireless connection of the first communication protocol is maintained.

4. The method of claim 1, further comprising:

during a current first wireless connection of the first communication protocol, extending the first wireless connection of the first communication protocol for a predetermined period in response to one of following conditions, as long as the second wireless connection of the second communication protocol exists:

an additional second signal is received from the second electronic device; and an application related to the second electronic device is launched or running in the first electronic device.

5. An electronic device comprising:

a peripheral unit configured to transmit a first signal, the first signal indicating the electronic device to change from an inactive state to an active state;

a first communication unit implementing a first communication protocol, configured to establish a first wireless connection of the first communication protocol between the electronic device and a cooperating device;

a second communication unit implementing a second communication protocol, configured to establish a second wireless connection of the second communication protocol the electronic device and the cooperating device, via which a second signal indicating that a cooperating device is in use is transmitted from the cooperating device to the electronic device, wherein the first wireless connection of the first communication protocol consumes relatively higher power and provides a relatively higher data rate than the second wireless connection of the second communication protocol; and a control unit, coupled to the peripheral unit, the first communication unit and the second communication unit, configured to initiate a procedure of establishing the first wireless connection between the electronic device and the cooperating device in response to detecting the first signal from the peripheral unit and detecting the second signal from the cooperating device, wherein the first signal is detected within a predetermine time after detecting the second signal, wherein the control unit is further configured to:

maintain the second wireless connection of the second communication protocol after the first wireless connection of the first communication protocol is established between the first electronic device and the cooperating device, not initiate, by the control unit, the procedure of establishing the first wireless connection of the first communication protocol between the electronic device and the cooperating device, when the first signal is not detected within the predetermined time after detecting the second signal, maintain the initiated first wireless connection for a predetermined period time unless the electronic device extends the first wireless connection during the current first wireless connection; and extend the first wireless connection when an additional in-use signal is detected from the cooperating device via the second wireless connection.

6. The electronic device of claim 5, wherein in the step of initiating the procedure of establishing the first wireless connection, the second communication unit transmits a third signal to the cooperating device, via the second wireless connection of the second communication protocol, to request the cooperating device to establish the first wireless connection with the electronic device.

7. The electronic device of claim 5, wherein as long as the electronic device and the cooperating device are connectable via the second wireless connection of the second communication protocol, the control unit maintains the second wireless connection of the second communication protocol regardless of whether the first wireless connection of the first communication protocol is maintained.

8. The electronic device of claim 5, wherein during a current first wireless connection of the first communication protocol, the control unit extends the first wireless connection of the first communication protocol for a predetermined period in response to one of following conditions, as long as the second wireless connection of the second communication protocol exists:

an additional second signal is received, from the cooperating device; and an application related to the cooperating device is launched or running in the electronic device.

\* \* \* \* \*